United States Patent Office 2,812,738
Patented Nov. 12, 1957

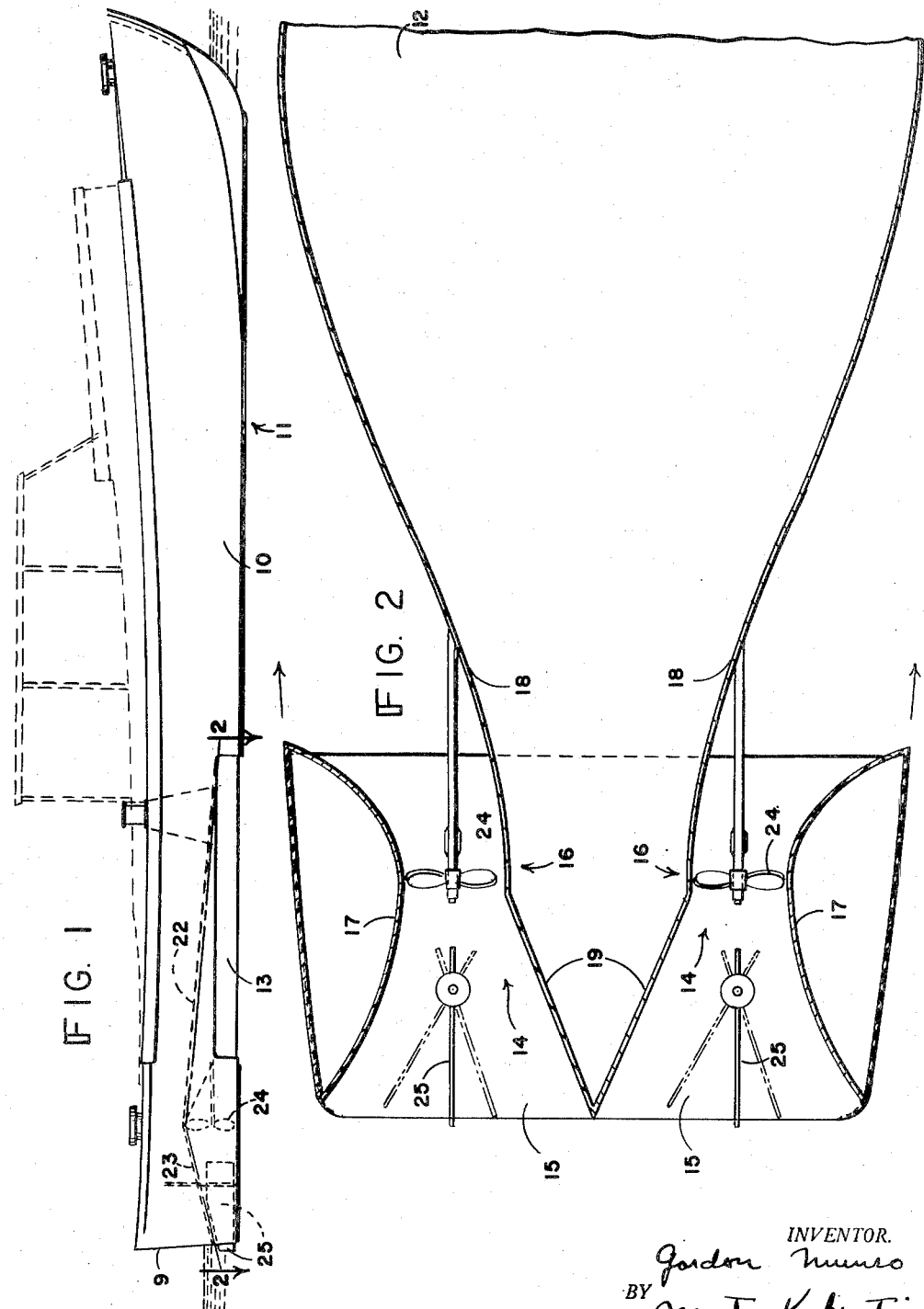

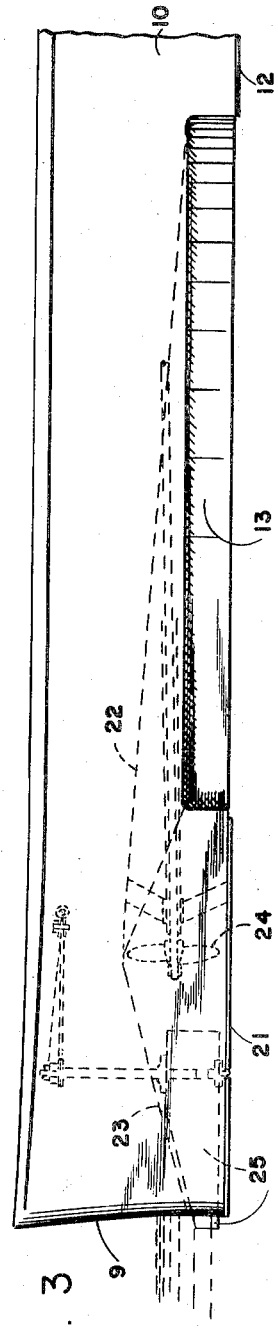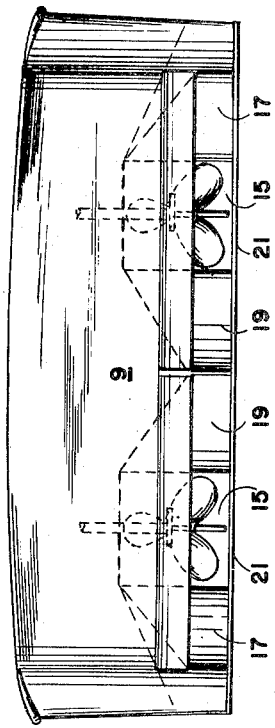

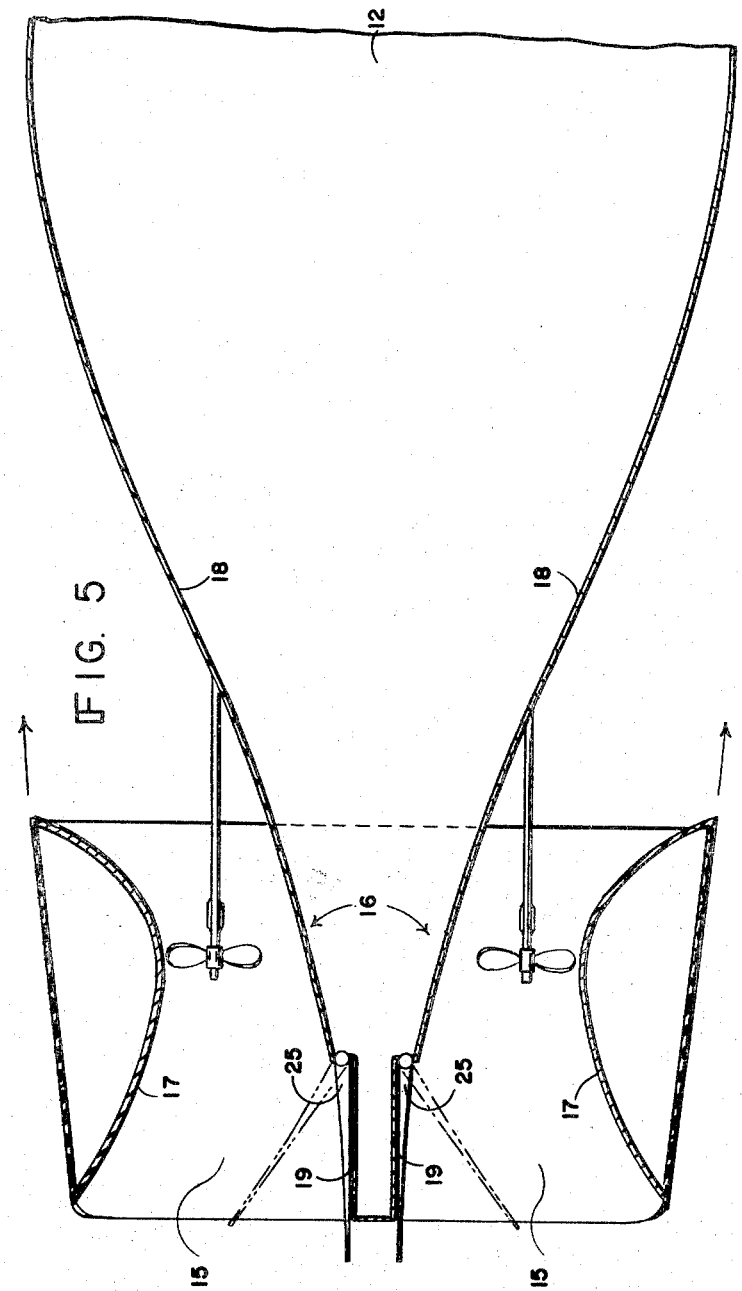

2,812,738

SIDE ENTRANCE TUNNEL HULL

Gordon Munro, Boston, Mass., assignor to Murray & Tregurtha, Inc., a corporation of Massachusetts Application November 8, 1954, Serial No. 467,299

4 Claims. (Cl. 115—39)

This invention relates to vessels having tunnel hulls to permit navigation in shallow water and particularly to a vessel having a hull with side entrance tunnels.

For shallow water towing operations such as in rivers and canals, a tug of shallow draft capable of developing high thrust is essential. These requirements, however, are generally inconsistent with one another, owing to the fact that the maximum amount of thrust which can be produced is largely dependent upon the disc area of the largest size screw or screws which a vessel of predetermined draft can accommodate.

To overcome this difficulty, hulls have been provided with tunnels extending along their bottoms, and the screws have been positioned within such tunnels so that the screws will not add appreciably to the draft of the vessel. Although this arrangement is satisfactory if the draft of the vessel is substantially less than the depth of the water, it becomes impractical if the draft of the vessel is nearly as great as the depth of the water, since under such circumstances the flow of water to the screws is greatly reduced and but very low thrust can be developed.

Accordingly, it is an object of the present invention to provide a tunnel vessel of improved design wherein the thrust efficiency of the screw is extremely high even though the draft of the vessel closely approaches the depth of water in which it is operating.

In brief, I have discovered that by utilizing a hull having side entrance tunnels rather than the usual bottom entrance tunnel, the flow of water to the screws will not be restricted as it is in a bottom entrance tunnel when the vessel is operated in waters whose depth only slightly exceeds the draft of the vessel. Thus, the thrust efficiency will be correspondingly enhanced. To further increase the amount of thrust, the diameter of the screw employed is considerably greater than the draft of the vessel itself, this being made possible by gradually increasing the height of the tunnels from their entrances to a portion intermediate the tunnel entrance and exit wherein the screw is positioned, the entrance and exit being positioned below the water line to prevent air from being drawn into the tunnel. Preferably to further increase the screw disc area without increasing the draft of the vessel, twin screws are used. For steering purposes, there are provided twin rudders, one in each tunnel astern of said screws.

The novel features of this invention together with further objects and advantages thereof will become more readily apparent when considered in connection with the accompanying drawings in which:

Fig. 1 is a side elevation view of a preferred embodiment of the vessel according to this invention;

Fig. 2 is a sectional view on an enlarged scale taken on lines 2—2 of Fig. 1;

Fig. 3 is a side elevation view showing the stern portion of the vessel as illustrated in Fig. 1 on an enlarged scale;

Fig. 4 is an end view showing the stern of the vessel according to this invention; and Fig. 5 is a view similar to Fig. 2 illustrating a modified steering arrangement for the vessel of this invention.

Referring now to the drawings wherein like elements are designated by the same reference characters, and referring more particularly to Figs. 1-4, it will be observed that the hull 11 of the vessel in accordance with this invention has a substantially flat bottom 12, vertical sides 10, and a transom stern 9, said sides and stern thus being joined to said bottom to form a right angled chine for maximum buoyancy with least draft. Formed in each of the sides 10 at the bottom thereof are the entrance openings 13 to a pair of tunnels designated generally by numerals 14, such tunnels having their exit openings 15 in the stern 9 of the hull. As shown in detail in Figs. 1 and 3, the entrance openings of the tunnels 14 are substantially greater in length than in height to permit a relatively large amount of water to enter while having the top of said entrance openings positioned below the waterline. At the stern 9 of the vessel, relatively free discharge of water from the tunnels is likewise permitted while having the tunnel exit openings 15 below the waterline, the widths of the exits being substantially greater than their heights. In fact, inner side walls 16 of the respective tunnels 14 come together at the stern 9, and outer side walls 17 join the sides of the hull 11 at that point so that the tunnel exits 15 occupy substantially the entire lower portion of the transom stern 9 of the vessel.

More specifically, outer side walls 17 are each convex, curving inwardly from the side 10 of hull 11 at the entrance to tunnel 14 and then outwardly joining side 10 once again at the stern of the vessel. Each inner side wall 16 is formed in two sections 18 and 19. The forward section 18 is coextensive with side 10 of hull 11 so far as a point laterally opposite outer side walls 17 where the latter becomes tangent to a line which parallels the fore and aft axis of the vessel. As shown in Fig. 2, section 18 is convex in part and slightly concave in part to permit a free flow of water to the above mentioned point where inner side wall section 18 also becomes tangent to a fore and aft line. From this point on, the inner side wall of each tunnel is formed with section 19 which is planar and extends inwardly to the center of the vessel at its stern, as previously mentioned. Bottom walls 21 of the tunnels are also planar, these being made up of one or more bottom plates coextensive with the bottom 12 of the hull 11. That is to say, bottom walls 21 are coplanar with the bottom 12 of hull 11 and in effect form a part of it. This being the case, walls 21 preferably comprise heavier material than the other walls of the tunnels 14, even heavier than the remainder of the hull bottom 12 in order to protect the screws and rudders mounted in the tunnels as will be described hereinafter.

In order that the vessel of this invention be capable of mounting screws of substantially greater diameter than the draft of the vessel itself, the top walls of the tunnels 14 include two sections 22 and 23, which extend upwardly from entrances 13 and exits 15, respectively. These sections come together forming an obtuse angle directly above the points of tangency mentioned in connections with side walls 16 and 17, thereby placing a substantial part of tunnels 14 above the waterline of hull 11 and permitting the use of screws of correspondingly larger diameter. Hence, the amount of thrust obtainable will be very much greater than could be obtained with screws whose diameter is restricted to the draft of the vessel, since the disc area of a screw increases as the square of its diameter.

As best shown in Figs. 2, 3, and 4, there are provided two three-bladed screws 24, one in each tunnel 14, which are fitted closely adjacent the walls of the respective tunnels where sections 22 and 23 come together, that is, where the heights of the tunnels are greatest. It will be observed with particular reference to Fig. 2 that the widths of the tunnels 14 are substantially equal to their heights at this point and the tops thereof are curved to conform with the screw diameter so as to provide for maximum thrust efficiency of the screws. To further enhance the efficiency, the walls of the tunnels 14 aft of the screws 24 are so contoured as to make the cross sectional area of the tunnels substantially uniform though of decreasing height and increasing width. Finally, there are provided rudders 25 in these regions astern of screws 24 for steering purposes. As shown in Figs. 2 and 3, each rudder 25 is pivotally mounted in the tunnel about a vertical axis midway between sidewalls 16 and 17. The lower edges of rudders 25 are horizontal, whereas the upper edges are inclined in part at the same angle as sections 19 of the top walls of tunnels 14. In this way, rudders 25 are fitted with their upper and lower edges closely adjacent the tops and bottoms of the tunnel walls for optimum steering control by diverting substantially the entire stream of water passing through the tunnels.

Referring now to Fig. 5, there is illustrated an alternative arrangement of rudders 25 in tunnels 14. In the arrangement of Fig. 5, rudders 25 pivot from the inner wall section 19 only in one direction as shown. Hence the rudders are moved individually, the starboard one being utilized for directional changes to starboard and the port one for changes to port. The advantage of this arrangement lies in the reduced amount of drag produced by the rudders when in the neutral position, since, when in such position, rudders 25 lie adjacent the inner side walls of the tunnels so that the water being expelled from the tunnels flows freely by them. Inner side wall sections 19 being inset slightly so as to provide a recess for rudders 25 when in the neutral position, the rudders in effect form a continuous part of the inner side walls of the tunnels as shown.

In the preferred embodiment of this invention which has been built and tested, the hull was 35' long and of 10' beam. The tunnels were of such proportion as to accommodate 15" diameter screws, the draft of the vessel being 12" fully loaded. Of course the vessel may be so proportioned as to be most useful in waters of greater or lesser depth with a corresponding change in screw diameter and available thrust. Various modifications within the spirit and scope of the invention will occur to those skilled in the art.

Therefore, what is claimed is:

1. A shallow draft vessel having a substantially flat bottomed hull, vertical sides and a transom stern, each of said vertical sides at its lower edge meeting said flat bottom in a right angled chine juncture substantially throughout the length of said vessel and said transom stern at its lower edge meeting said flat bottom in a right angled juncture throughout the width of said vessel, said hull being provided with a pair of tunnels each having an entrance opening in a side of said hull extending upwardly from the bottom edge thereof and an exit opening in the stern of said hull extending upwardly from the lower edge thereof with both of said openings terminating below the waterline of said vessel with said flat bottom forming the lower wall of said tunnels, said tunnels each having an intermediate portion of greater height than its entrance and exit openings whereby the former extends at least in part above the waterline of said hull; a propulsion screw mounted in said intermediate portion in each of said tunnels and closely spaced to the walls thereof with said flat bottom forming the lower wall of said tunnels extending for a substantial distance forward of said screws and extending aft of said screws to said transom stern, said screws extending at least in part above the waterline of said hull, and rudder means pivotally mounted in each of said tunnels to divert the flow of water therein.

2. A shallow draft vessel as set forth in claim 1 wherein said rudder means are pivoted about axes perpendicular to the bottom walls of the respective tunnels substantially midway between their respective side walls.

3. A shallow draft vessel as set forth in claim 1 wherein said rudder means are pivoted about axes perpendicular to the bottom walls of the respective tunnels substantially adjacent the respective inner side walls of said tunnels when said rudders are in a neutral position.

4. A shallow draft vessel as set forth in claim 1 wherein said entrance openings have substantially greater lengths than heights and said exit openings extend from the center line of said hull to opposite sides thereof and have substantially greater widths than heights, said tunnels each being formed with a flat bottom wall substantially coplanar with the bottom of said hull, a top wall formed with two sections disposed at an angle with respect to one another so that the height of each tunnel increases from the entrance to a point intermediate the entrance and the exit and then decreases toward the exit, a convex outer side wall, and an inner side wall which extends inwardly from approximately said intermediate point to the center line of said hull at the stern thereof, the cross-sectional area of each of said tunnels being substantially uniform astern of said intermediate point.

References Cited in the file of this patent

UNITED STATES PATENTS

| 1,070 | Jackson | Jan. 18, 1839 |
| 600,483 | Nowak | Mar. 8, 1898 |
| 2,030,375 | Kort | Feb. 11, 1936 |

FOREIGN PATENTS

| 332,840 | Germany | Feb. 10, 1921 |

OTHER REFERENCES

The Kort Nozzle, published by Kort Co., Inc., 17 Battery Place, N. Y., November 7, 1935.